US012761952B2

(12) United States Patent
Hu et al.

(10) Patent No.: US 12,761,952 B2
(45) Date of Patent: Oct. 13, 2026

(54) JOB PROCESSING METHOD AND APPARATUS, COMPUTER DEVICE, AND STORAGE MEDIUM

(71) Applicant: Huawei Technologies Co., Ltd., Shenzhen (CN)

(72) Inventors: Shoufeng Hu, Beijing (CN); Bo Zhu, Beijing (CN); Jin Guo, Xi'an (CN); Dong Dong, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 404 days.

(21) Appl. No.: 18/400,186

(22) Filed: Dec. 29, 2023

(65) Prior Publication Data

US 2024/0134688 A1 Apr. 25, 2024
US 2024/0231901 A9 Jul. 11, 2024

Related U.S. Application Data

(63) Continuation of application No. PCT/CN2022/086057, filed on Apr. 11, 2022.

(30) Foreign Application Priority Data

Jun. 30, 2021 (CN) ......................... 202110739273.8
Sep. 10, 2021 (CN) ......................... 202111062578.6

(51) Int. Cl.
*G06F 9/48* (2006.01)

(52) U.S. Cl.
CPC ................................. *G06F 9/4881* (2013.01)

(58) Field of Classification Search
CPC .................................................... G06F 9/4881
USPC ............................................................. 718/1
See application file for complete search history.

(56) References Cited

U.S. PATENT DOCUMENTS 10,409,641 B1 * 9/2019 Blessing ............... G06F 9/5061
2020/0082273 A1 * 3/2020 Rossi ...................... G06N 3/063
2021/0109796 A1 * 4/2021 Fozard ...................... G06F 9/48
2022/0138012 A1 * 5/2022 Nie ....................... G06F 9/5088
718/104

FOREIGN PATENT DOCUMENTS

CN 101697141 A 4/2010
CN 104778079 A 7/2015

OTHER PUBLICATIONS

Anonymous, "Grid computing—Wikipedia—Version of Feb. 14, 2018", Feb. 14, 2018 (Feb. 14, 2018), XP055849209, total 14 pages.
Rosario M. Piro et al, "Using historical accounting information to predict the resource usage of grid jobs", Future Generation Computer Systems, Elsevier Science Publishers. Amsterdam, NL, vol. 25, No. 5, May 1, 2009 (May 1, 2009 ), XP025947686, total 12 pages.

* cited by examiner

*Primary Examiner* — Charlie Sun
(74) *Attorney, Agent, or Firm* — Slater Matsil, LLP

(57) ABSTRACT

A job processing method is provided. In this method, after receiving a to-be-processed job, a scheduling node in a high-performance computing system predicts, based on a category of the job, a quantity of resources consumed in real time in a process of executing the job. Because quantities of resources consumed in real time in a process of executing jobs of a same category are close, compared with a specified resource quantity, a predicted resource quantity is closer to a quantity of resources actually consumed by the job.

19 Claims, 8 Drawing Sheets

JOB PROCESSING METHOD AND APPARATUS, COMPUTER DEVICE, AND STORAGE MEDIUM

CROSS-REFERENCE TO RELATED APPLICATIONS

This application is a continuation of International Application No. PCT/CN2022/086057, filed on Apr. 11, 2022, which claims priority to Chinese Patent Application No. 202110739273.8, filed on Jun. 30, 2021 and Chinese Patent Application No. 202111062578.6, filed on Sep. 10, 2021. All of the aforementioned applications are hereby incorporated by reference in their entireties.

TECHNICAL FIELD

This application relates to the field of job scheduling technologies, and in particular, to a job processing method and apparatus, a computer device, and a storage medium.

BACKGROUND

High-performance computing (HPC) is a cross-industry and cross-application computing discipline, which is widely used in computing of large-scale scientific problems and processing of massive data, such as weather forecast, vehicle simulation, biopharmaceutical, gene sequencing, nuclear explosion simulation, and chip design and manufacturing. A computer cluster capable of providing an HPC service may be referred to as an HPC system. With HPC performance, the HPC system can process a large quantity of jobs submitted by users, to complete computing services of the users.

Currently, a job processing process may be as follows: A scheduling node in the HPC system supports a plurality of users in submitting jobs to the HPC system at the same time. When submitting a job, each user further specifies a quantity of resources required in real time in a process of executing the job. For a job submitted by a user, the scheduling node may allocate the job to a computing node with sufficient idle resources in the HPC system based on a quantity, specified by the user, of resources required by the job, and the computing node executes the job. However, a quantity of resources consumed in a process of executing the job may change continuously, the quantity, specified by the user, of resources required by the job is usually a maximum value of the quantity of resources consumed (which may also be referred to as a peak resource quantity), and the quantity of resources actually consumed in the process of executing the job does not keep reaching the peak resource quantity. Consequently, resources of the computing node are not fully utilized, and effective utilization is low. Therefore, how to provide a more efficient job processing method becomes an urgent technical problem to be resolved.

SUMMARY

This application provides a job processing method and apparatus, a computer device, and a storage medium, so that in a process of processing a job in a high-performance computing system, effective utilization of resources in a computing node can be improved, and job processing efficiency can be improved. The technical solutions are as follows:

According to a first aspect, a job processing method is provided. The method may be performed by a scheduling node in a high-performance computing system. After receiving a job to be processed by the high-performance computing system, the scheduling node first determines a category of the job, and then predicts a predicted resource quantity of the job based on the category of the job. The predicted resource quantity is a predicted quantity of resources consumed in real time in a process of executing the job. Then, the scheduling node schedules, based on the predicted resource quantity of the job, a computing node in the high-performance computing system to execute the job.

In this method, after receiving the to-be-processed job, the scheduling node in the high-performance computing system predicts, based on the category of the job, the quantity of resources consumed in real time in the process of executing the job. Because quantities of resources consumed in real time in a process of executing jobs of a same category are close, compared with a specified resource quantity, the predicted resource quantity is closer to a quantity of resources actually consumed by the job. Therefore, when the scheduling node schedules, based on the predicted resource quantity, the computing node in the high-performance computing system to execute the job, effective utilization of resources in the computing node can be improved, and job processing efficiency can be improved.

In a possible implementation, that the scheduling node predicts a predicted resource quantity of the job based on the category of the job includes: The scheduling node predicts, based on a reference resource quantity corresponding to the category of the job, a quantity of resources consumed in real time in the process of executing the job, to obtain the predicted resource quantity. The reference resource quantity is obtained based on a quantity of resources actually consumed by a historical job of the category.

Based on the foregoing possible implementation, when predicting, based on the category of the job, the quantity of resources consumed in real time in the process of executing the job, the scheduling node may predict, based on the reference resource quantity corresponding to the category, the quantity of resources consumed in real time in the process of executing the job. Because the reference resource quantity is obtained based on the quantity of resources actually consumed by the historical job of the category, the predicted resource quantity predicted based on the reference resource quantity corresponding to the category is closer to the quantity of resources actually consumed by the job. Therefore, when the scheduling node schedules, based on the predicted resource quantity, the computing node in the high-performance computing system to execute the job, effective utilization of resources in the computing node can be further improved.

In a possible implementation, before the scheduling node determines the category of the job, the method further includes: The scheduling node receives a mode adjustment instruction, and enables a prediction mode according to the mode adjustment instruction. The mode adjustment instruction instructs to enable the prediction mode, and provide, in the prediction mode, a function of predicting a quantity of resources required by a job.

Correspondingly, that the scheduling node predicts, based on a reference resource quantity corresponding to the category of the job, a quantity of resources consumed in real time in the process of executing the job includes: The scheduling node predicts, in the prediction mode based on the reference resource quantity corresponding to the category of the job, the quantity of resources consumed in real time in the process of executing the job.

Based on the foregoing possible implementation, the prediction mode is a working mode of the scheduling node, and the scheduling node may adjust a working mode of the scheduling node according to a mode adjustment instruction. In this way, a skilled person may deliver a mode adjustment instruction to the scheduling node, to trigger the scheduling node to adjust a working mode, so as to adapt to different application scenarios.

In a possible implementation, that the scheduling node predicts, in the prediction mode based on the reference resource quantity corresponding to the category of the job, the quantity of resources consumed in real time in the process of executing the job includes: The scheduling node first obtains a quantity of historical jobs of the category of the job in the prediction mode. If the quantity of historical jobs of the category is greater than or equal to a quantity threshold, the scheduling node predicts, based on the reference resource quantity corresponding to the category, the quantity of resources consumed in real time in the process of executing the job.

Based on the foregoing possible implementation, because a quantity of resources required in real time in a process of executing the historical job of the category is sample data of the category, and the reference resource quantity corresponding to the category is determined by the quantity of resources actually consumed by the historical job of the category, if the quantity of historical jobs of the category is greater than or equal to the quantity threshold, it indicates that a quantity of samples (that is, the quantity of historical jobs) of the category is sufficient in this case, and it is considered that an error between the reference resource quantity corresponding to the category and the quantity of resources actually consumed by the job is small in this case. Correspondingly, an error between the predicted resource quantity of the job that is predicted by the scheduling node based on the reference resource quantity corresponding to the category and the quantity of resources actually consumed by the job is small. This further improves accuracy of the predicted resource quantity of the job.

In a possible implementation, the job includes a specified resource quantity of the job, and that the scheduling node predicts, based on the reference resource quantity corresponding to the category of the job, the quantity of resources consumed in real time in the process of executing the job includes: The scheduling node predicts, based on the specified resource quantity of the job, the reference resource quantity corresponding to the category, and the quantity of historical jobs of the category, an average quantity of resources consumed in real time in a process of executing jobs of the category.

Based on the foregoing possible implementation, because the specified resource quantity of the job is a quantity, predicted by a user based on experience, of resources required in real time in a process of executing the job, and the reference resource quantity is obtained based on the quantity of resources actually consumed by the historical job of the category, the predicted resource quantity predicted based on the specified resource quantity, the reference resource quantity corresponding to the category, and the quantity of historical jobs of the category is closer to the quantity of resources actually consumed by the job. Therefore, when the scheduling node schedules, based on the predicted resource quantity, the computing node in the high-performance computing system to execute the job, effective utilization of resources in the computing node can be further improved.

In a possible implementation, before the scheduling node predicts the predicted resource quantity of the job based on the category of the job, the method further includes: The scheduling node obtains an average value of quantities of resources actually consumed by the historical jobs of the category as the reference resource quantity corresponding to the category, and records a correspondence between the category and the reference resource quantity corresponding to the category.

Based on the foregoing possible implementation, the correspondence between the category and the reference resource quantity is stored in advance, so that after a job of the category is subsequently received, when a predicted resource quantity of the job is predicted, the reference resource quantity corresponding to the category can be quickly found based on the correspondence, and the reference resource quantity corresponding to the category does not need to be calculated in real time based on the quantity of resources actually consumed by the historical job of the category, thereby improving efficiency of obtaining the reference resource quantity.

In a possible implementation, the job includes a job attribute of the job, and the job attribute indicates an attribute of the job. That the scheduling node determines a category of the job includes: The scheduling node determines the category of the job from a plurality of categories based on the job attribute of the job. Jobs of a same category share at least one attribute.

Based on the foregoing possible implementation, because jobs of a same category share at least one attribute, and a job attribute of a job indicates an attribute of the job, the scheduling node can quickly find a category of the job from a plurality of categories based on the job attribute of the job, thereby improving efficiency of determining the job category.

In a possible implementation, the job attribute includes a user type of a user to which the job belongs and a queue identifier of a job queue in which the job is located. That the scheduling node determines the category of the job from a plurality of categories based on the job attribute of the job includes: determining, based on a correspondence between the plurality of categories and job attributes, a category corresponding to the job attribute of the job in the plurality of categories as the category of the job. Each of the plurality of categories corresponds to one job attribute.

Based on the foregoing possible implementation, the scheduling node can quickly find, from the plurality of categories based on the correspondence between the plurality of categories and the job attributes, the category corresponding to the job attribute of the job, thereby further improving efficiency of determining the job category.

In a possible implementation, after the scheduling node schedules, based on the predicted resource quantity of the job, a computing node in the high-performance computing system to execute the job, the method further includes: The scheduling node receives, from the computing node, a quantity of resources actually consumed by the job, updates, based on the quantity of resources actually consumed and the quantity of historical jobs of the category of the job, the reference resource quantity corresponding to the category, and records a correspondence between an updated reference resource quantity and the category of the job.

Based on the foregoing possible implementation, a correspondence between the category and a latest reference resource quantity is stored, so that after a job of the category is subsequently received, when a predicted resource quantity of the job is predicted, the latest reference resource quantity corresponding to the category can be quickly found based on the correspondence, and the reference resource quantity corresponding to the category does not need to be calculated in real time based on the quantity of resources actually consumed by the historical job of the category, thereby improving efficiency of obtaining the reference resource quantity.

According to a second aspect, a job processing apparatus is provided, configured to perform the foregoing job processing method. Specifically, the job processing apparatus includes a functional module configured to perform the job processing method provided in the first aspect or any possible implementation of the first aspect.

According to a third aspect, a computer device is provided. The computer device includes a processor, and the processor is configured to execute program code, to enable the computer device to perform an operation performed in the foregoing job processing method.

According to a fourth aspect, a computer-readable storage medium is provided. The storage medium stores at least one piece of program code, and the program code is read by a processor, to enable a computer device to perform an operation performed in the foregoing job processing method.

According to a fifth aspect, a computer program product or a computer program is provided. The computer program product or the computer program includes program code, the program code is stored in a computer-readable storage medium, a processor of a computer device reads the program code from the computer-readable storage medium, and the processor executes the program code, to enable the computer device to perform the method provided in the first aspect or the possible implementations of the first aspect.

In this application, the implementations provided in the foregoing aspects may be further combined to provide more implementations.

DESCRIPTION OF EMBODIMENTS

Figure 1:
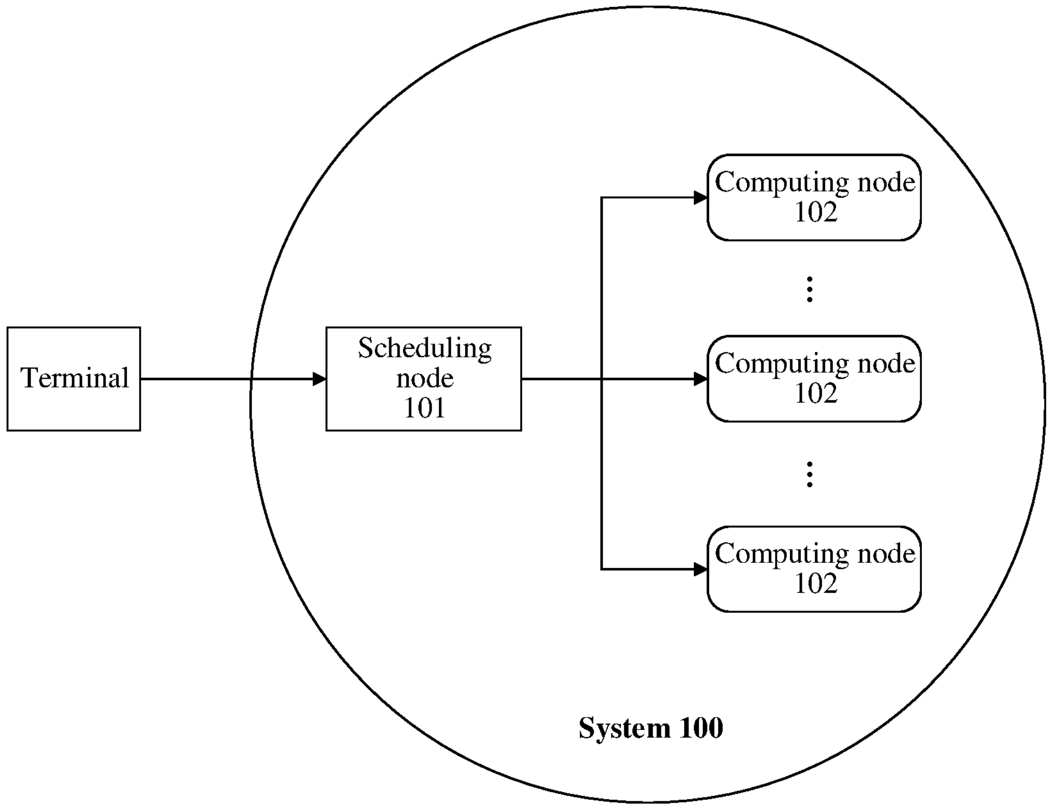
FIG. 1 is a schematic diagram of an HPC system according to this application.

For ease of understanding, some nouns in embodiments of this application are first explained as follows:

Job (job): It is a set of a group of program instances that need to be executed to complete a specific computing service, and usually corresponds to a group of processes, containers, or other runtime entities on one or more computers. The group of program instances includes at least one piece of program code.

Historical job: It is a job that has been processed or executed.

Specified resource quantity: It is a quantity, specified by a user, of resources required by in real time in a process of executing a job, or may be understood as a quantity, predicted by a user, of resources required by in real time in a process of executing a job.

Predicted resource quantity: It is a quantity, predicted by a scheduling node, of resources consumed by in real time in a process of executing a job.

Quantity of resources actually consumed: It is a quantity of resources consumed by in real time in a process of executing a job, that is, a quantity of resources actually consumed by the job, and may be referred to as a resource usage (Rusage).

Reference resource quantity: It is an average value of quantities of resources actually consumed by historical jobs of a same category, and may also be referred to as a base line (base line) of quantities of resources consumed in real time in a process of executing jobs of a same category.

Resource: It is at least one of a processor resource, a memory resource, a storage resource, or a network resource required when a computer program is run (or executed). The processor resource includes at least one of a central processing unit (CPU) resource, a graphics processing unit (GPU) resource, and an embedded neural-network processing unit (NPU) resource, and certainly may also include other types of processor resources. The storage resource includes a hard disk resource, and certainly may also include other types of storage resources. The network resource includes network bandwidth, and certainly may also include other types of network resources.

Idle resource: It is a resource that is not used, or may be understood as a resource in an idle state.

Resource quantity: It is a quantity of resources consumed by a job. For example, the processor resource is a CPU, and a resource quantity of the CPU is a quantity of CPU cores consumed by a job. The memory resource is used as an example, and a resource quantity of a memory consumed by a job is a memory size consumed by the job, for example, 1 GB or 512 MB. The storage resource is used as an example, and a resource quantity of storage resources consumed by a job is a hard disk size consumed by the job, for example, 1 GB or 512 MB. For example, the network resource is network bandwidth, and a resource quantity of the network bandwidth is a network bandwidth size consumed by a job.

The following further describes in detail embodiments of this application with reference to accompanying drawings.

FIG. 1 is a schematic diagram of an HPC system according to this application. Refer to FIG. 1. The system 100 may also be referred to as an HPC cluster. The system 100 includes a scheduling node 101 and a computing node 102. There is at least one computing node 101 in the system 100. The scheduling node 101 or the computing node 102 is a server cluster including one or more servers.

A terminal submits a job including a specified resource quantity to the scheduling node 101. The terminal is user equipment, and may also be referred to as another name such as a terminal station, a user terminal, a user apparatus, an access apparatus, a subscriber station, a subscriber unit, a mobile station, a user agent, a user apparatus, a portable terminal, a laptop terminal, or a desktop terminal. For example, the terminal may be a personal computer (for example, a notebook computer, a tablet computer, a desktop computer, or an ultrabook), a device having a website user interface (Web UI) function, a smartphone, a smart television, a smart wearable device, an artificial intelligence (AI) product, an intelligent vehicle, a smart instrument, or an internet of things (IoT) terminal.

The scheduling node 101 is configured to manage resource allocation to each computing node 102 in the system 100. For example, the scheduling node 101 runs a scheduling program based on a specified resource quantity of a job submitted by a user, to query for a computing node 102 with a quantity of idle resources greater than or equal to the specified resource quantity in the system 100. The scheduling node 101 sends the job to the computing node 102, and the computing node 102 executes the job.

This application provides a technical solution in which a scheduling node predicts, based on a category of a job, a quantity of resources consumed in real time in a process of executing the job, and schedules, based on a predicted resource quantity, a computing node to execute the job. Because quantities of resources consumed in real time in a process of executing jobs of a same category are close, compared with a specified resource quantity, the predicted resource quantity is closer to a quantity of resources actually consumed by the job, so that effective utilization of resources in the computing node can be improved.

Figure 2:
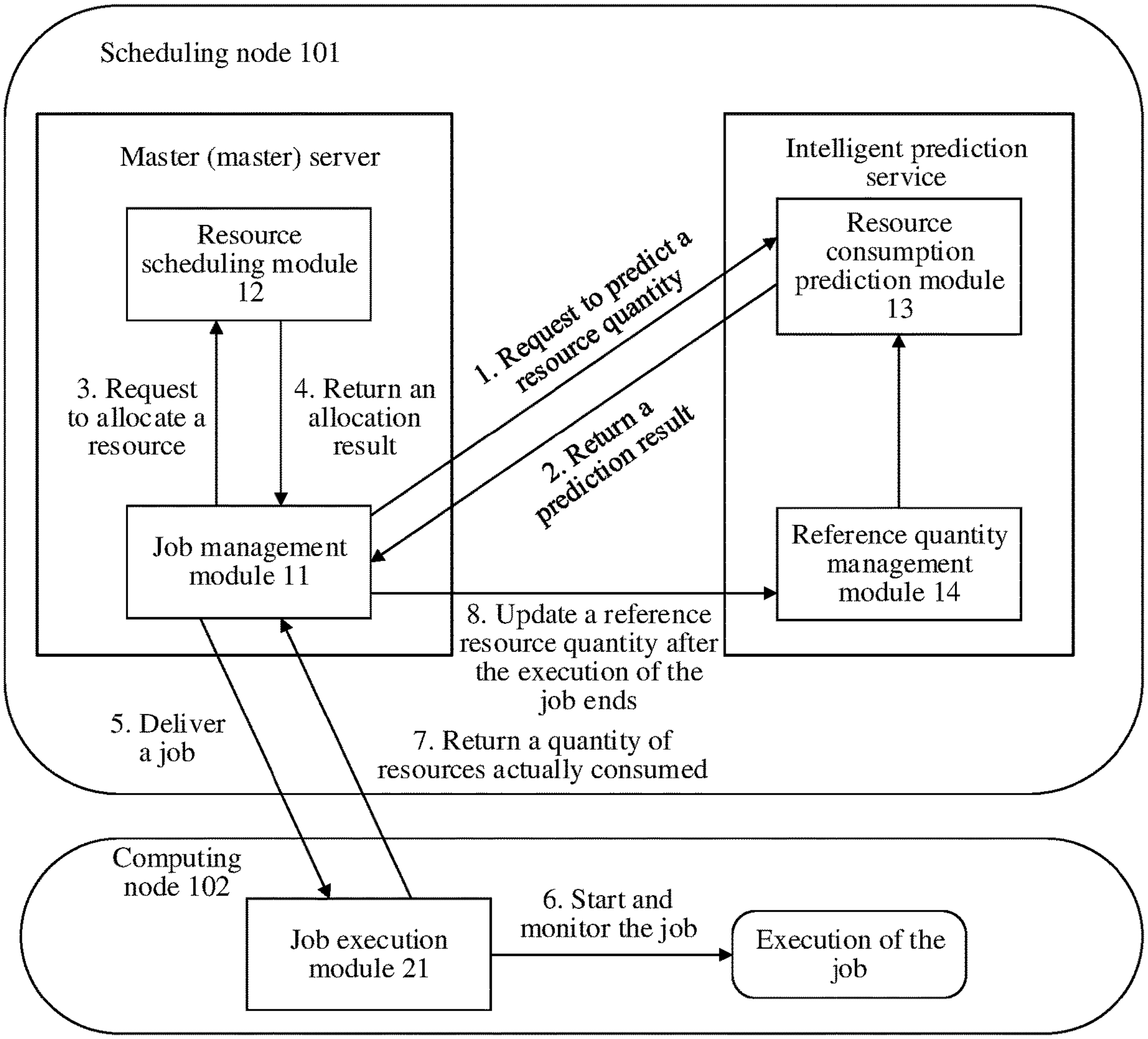
FIG. 2 is a schematic diagram of interaction between a scheduling node and a computing node according to this application.

To implement this technical solution, a scheduling node is improved in this application. For example, FIG. 2 is a schematic diagram of interaction between a scheduling node and a computing node according to this application. The scheduling node 101 is configured to provide a master service and an intelligent prediction service for the terminal. The master service includes allocating a resource to the job submitted by the terminal, and scheduling a computing node 102 to execute the job submitted by the terminal. The intelligent prediction service is a newly added service of the scheduling node 101, including predicting, based on a category of the job, a predicted resource quantity of the job submitted by the terminal.

In a possible implementation, the scheduling node 101 includes a job management module 11 and a resource scheduling module 12, to provide the master service. The scheduling node 101 further includes a resource consumption prediction module 13 and a reference quantity management module 14, to provide the intelligent prediction service.

In a possible implementation, the computing node 102 is configured to provide an agent service, and the agent service includes executing a job and collecting statistics on a quantity of resources actually consumed by the job. The agent service is provided by a job execution module 21 in the computing node 102.

After receiving the job submitted by the terminal, the job management module 11 requests the resource consumption prediction module 13 to predict a quantity of resources consumed in real time in a process of executing the job. After receiving the request of the job management module 11, the resource consumption prediction module 13 determines the category of the job, and predicts the predicted resource quantity of the job based on the category of the job. For example, the resource consumption prediction module 13 predicts the predicted resource quantity of the job based on a reference resource quantity corresponding to the category and the specified resource quantity of the job. The resource consumption prediction module 13 returns the predicted resource quantity of the job as a prediction result to the job management module 11. The job management module 11 requests, by using the predicted resource quantity of the job, the resource scheduling module 12 to allocate a resource to the job. After receiving the request of the job management module 11, the resource scheduling module 12 allocates a resource (that is, allocates a computing node) to the job based on the predicted resource quantity of the job, and delivers an allocation result to the job management module 11. The job management module 11 delivers the job to the computing node 102 indicated by the allocation result. The job execution module 21 in the computing node 102 executes the delivered job, monitors, in a process of executing the job, a quantity of resources actually consumed by the job, and after the job is completed, returns the quantity of resources actually consumed by the job to the job management module 11. The job management module 11 sends the quantity of resources actually consumed by the job to the reference quantity management module 14. The reference quantity management module 14 updates, based on the quantity of resources actually consumed by the job, the reference resource quantity corresponding to the category of the job, so that the resource consumption prediction module 13 obtains an updated reference resource quantity corresponding to the category from the reference quantity management module 14, and subsequently may predict a predicted resource quantity of a new job of the category based on the updated reference resource quantity corresponding to the category.

Figure 3A:
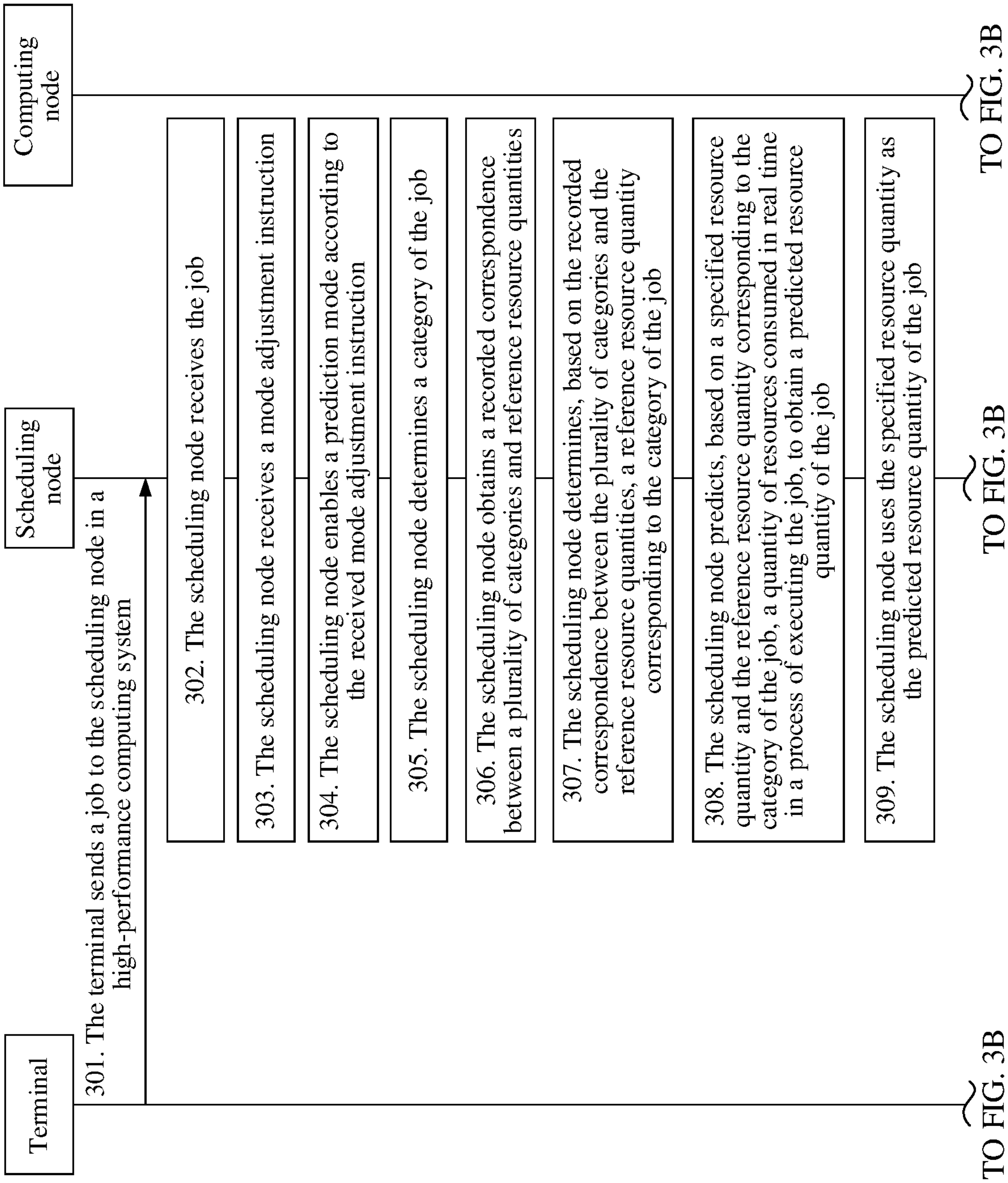
FIG. 3A and FIG. 3B are a flowchart of a job processing method according to this application.
Figure 3B:
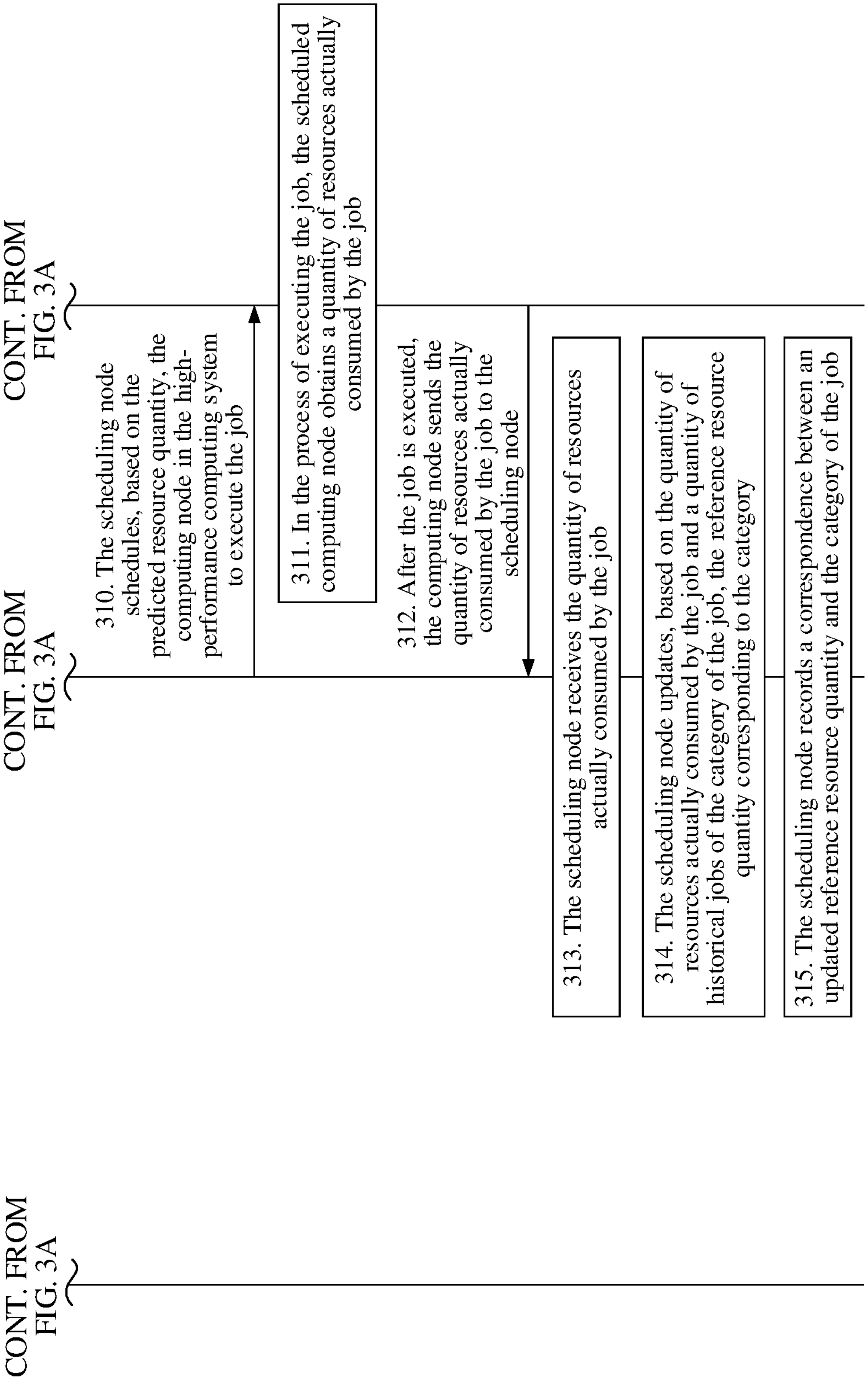

To further describe the process in which the scheduling node schedules the computing node for the job to execute the job in a prediction manner, refer to a flowchart, shown in FIG. 3A and FIG. 3B, of a job processing method according to this application.

Step 301: A terminal sends a job to a scheduling node in a high-performance computing system.

The high-performance computing system is configured to provide services such as job submission, scheduling, execution, and monitoring for a user. The process in which the terminal sends the job to the scheduling node is a process in which the terminal submits the job to the scheduling node.

The job sent by the terminal is any job to be executed in the high-performance computing system, that is, a job to be processed by the high-performance computing system. In a possible implementation, the job includes a specified resource quantity of the job, and the specified resource quantity of the job includes a specified resource quantity of at least one type of resource required for executing the job, for example, a specified resource quantity of at least one type of resource of a processor resource, a memory resource, a storage resource, and a network resource. The processor resource, the memory resource, the storage resource, and the network resource are described above, and details are not described herein again.

In a possible implementation, the job further includes a job attribute of the job, and the job attribute indicates an attribute of the job. The job attribute includes a queue identifier of a job queue in which the job is located and a user type of a user to which the job belongs. In other words, the queue identifier and the user type are attributes of the job. Jobs submitted by users of a same user type are used to complete similar computing services. Therefore, quantities of resources actually consumed by the jobs submitted by the users of the same user type have a same characteristic. For example, the jobs submitted by the users of the same user type all consume a large quantity of processor resources in real time during execution, for example, consume a large quantity of CPU cores in real time. Because computing services that a same service department is responsible for are similar, optionally, the user type of the user indicates a service department in which the user is located. The jobs of the users of the same user type are submitted to a same job queue on the scheduling node. Therefore, quantities of resources actually consumed by the jobs in the same job queue have a same characteristic.

In a possible implementation, the job attribute further includes a user identifier of the user to which the job belongs, to indicate the user who submits the job. In a possible implementation, the job attribute further includes a job tag of the job. The job tag includes at least one of a service type of a computing service implemented by the job, a service identifier, and a computing node tag, and the computing node tag indicates a computing node preferred by the user to execute the job. There may be at least one computing node tag, and each computing node tag includes an identifier of at least one computing node preferred by the user to execute the job. It should be noted that each item of content included in the job attribute is an attribute of the job. For example, the user type is an attribute, and the queue identifier is an attribute.

In a possible implementation, the user delivers a service execution instruction to the terminal. The service execution instruction instructs to execute the job. For example, the job execution instruction includes the job. After receiving the service execution instruction, the terminal sends the job to the scheduling node based on the service execution instruction.

Step 302: The scheduling node receives the job.

The scheduling node maintains a plurality of job queues, each job queue corresponds to at least one user type, and each job queue is configured to store jobs submitted by users of a corresponding user type, that is, jobs provided by users of different user types may be submitted to a same job queue. Because there may be at least one user belonging to a same user type, correspondingly, each job queue corresponds to at least one user.

In a possible implementation, after the scheduling node receives the job, if the job includes the queue identifier of the job queue, the scheduling node submits the job to the job queue. If the job does not include the queue identifier of the job queue or the user type, the scheduling node submits the job to a default job queue. The default job queue may be a job queue corresponding to the user type of the user to which the job belongs. For example, if the job does not include the queue identifier, the scheduling node stores, based on a correspondence between a user type and a job queue, the job into the job queue corresponding to the user type. For another example, if the job does not include the queue identifier of the job queue or the user type, but includes the user identifier of the user, the scheduling node determines, based on a correspondence between a user identifier and a user type, the user type to which the user belongs, and stores the job into the job queue corresponding to the user type. Alternatively, the default job queue may be a dedicated job queue specified by the scheduling node for the user to which the job belongs, rather than the job queue corresponding to the user type of the user to which the job belongs. The job does not include the queue identifier of the job queue, but includes the user identifier. In this case, the scheduling node submits the job to the dedicated job queue corresponding to the user identifier.

After the job is stored in the job queue, the job is queued in the job queue and waits for the scheduling node to read. In a possible implementation, the scheduling node reads jobs from a plurality of job queues through polling based on a preset polling rule. When the job is located at the beginning of the job queue (that is, the first job in the job queue) and the job queue is polled, the scheduling node reads the job from the job queue. The preset polling rule includes polling in descending order of priorities of the job queues, and each job queue corresponds to one priority. A computing service corresponding to a job in a job queue with a higher priority has a higher priority, and a computing service corresponding to a job in a job queue with a lower priority has a lower priority. Alternatively, the preset polling rule includes sequentially polling the job queues as the job queues have no priorities.

For example, the job is a job A submitted by a user 1-1 of a user type 1. If a job attribute of the job A includes 1 (that is, a queue identifier of a job queue) and 1-1 (that is, a user identifier), after receiving the job A, the scheduling node stores the job A into a job queue 1. When the job queue 1 is polled, and the job A is located at the beginning of the job queue 1, the scheduling node reads the job A from the job queue 1.

In a possible implementation, the scheduling node includes a communication module and a job management module. The communication module receives the job, and the job management module submits the job to the job queue and reads the job from the job queue.

Step 303: The scheduling node receives a mode adjustment instruction. The mode adjustment instruction instructs to enable a prediction mode, and provide, in the prediction mode, a function of predicting a quantity of resources required by a job.

The prediction mode is a working mode in which a resource is scheduled for a job by predicting a predicted resource quantity of the job. In a possible implementation, the mode adjustment instruction includes a prediction parameter, and the prediction parameter indicates the scheduling node to provide a resource scheduling function for the job in a working mode. The prediction mode is a working mode of the scheduling node. Optionally, the prediction parameter is a first prediction parameter, and the first prediction parameter indicates to provide, in the prediction mode, the function of predicting a quantity of resources required by a job. In this case, the mode adjustment instruction including the first prediction parameter instructs to enable the prediction mode, and provide, in the prediction mode, the function of predicting a quantity of resources required by a job.

In another possible implementation, in addition to the prediction mode, working modes of the scheduling node further include a non-prediction mode. The non-prediction mode is a working mode in which a resource is scheduled for a job by using a specified resource quantity of the job. Optionally, the prediction parameter is a second prediction parameter, and the second prediction parameter indicates to provide the resource scheduling function in the non-prediction mode. In this case, the mode adjustment instruction including the second prediction parameter instructs to enable the non-prediction mode, and provide the resource scheduling function in the non-prediction mode.

To distinguish between the first prediction parameter and the second prediction parameter, the first prediction parameter and the second prediction parameter may be represented in different manners. For example, the first prediction parameter is "true", and the second prediction parameter is "false".

In a possible implementation, a skilled person inputs a mode adjustment instruction in a configuration interface of the scheduling node, and delivers the input mode adjustment instruction to the scheduling node through the configuration interface. Correspondingly, the scheduling node receives the mode scheduling instruction.

For ease of description, the mode adjustment instruction including the first prediction parameter is denoted as a first mode adjustment instruction, and the mode adjustment instruction including the second prediction parameter is denoted as a second mode adjustment instruction. In the embodiment shown in FIG. 3A and FIG. 3B, an example in which the mode adjustment instruction received by the scheduling node is the first mode adjustment instruction is used for description.

Step 304: The scheduling node enables the prediction mode according to the received mode adjustment instruction.

In a possible implementation, the prediction mode and the non-prediction mode are implemented by enabling or disabling prediction software, and the prediction software is configured to provide the function of predicting a quantity of resources required by a job. When the prediction software is enabled, the scheduling node works in the prediction mode. When the prediction software is disabled, the scheduling node works in the non-prediction mode.

For example, if the prediction parameter in the received mode adjustment instruction is the first prediction parameter, it indicates that the mode adjustment instruction is the first mode adjustment instruction. In this case, the scheduling node enables an application programming interface (API) of the prediction software, and the scheduling node works in the prediction mode. If the prediction parameter in the received mode adjustment instruction is the second prediction parameter, it indicates that the mode adjustment instruction is the second mode adjustment instruction. In this case, the scheduling node disables the API of the prediction software, and the scheduling node works in the non-prediction mode.

In another possible implementation, when the scheduling node is initialized, the prediction mode has been enabled, and a skilled person does not need to enable the prediction mode by using a mode adjustment instruction.

It should be noted that a process shown in the following steps 305 to 308 is a process in which the scheduling node obtains a predicted resource quantity of the job in the prediction mode. If the received mode adjustment instruction is the second mode adjustment instruction, after receiving the job, the scheduling node does not perform the following steps 305 to 308, and performs the following step 309. In addition, the scheduling node may first perform steps 303 and 304, and then perform step 302. An execution sequence of step 302 and steps 303 and 304 is not limited in this application. A working mode of the scheduling node does not need to be enabled repeatedly after enabled.

Step 305: The scheduling node determines a category of the job.

A correspondence between a plurality of categories and job attributes is recorded in the scheduling node, and each category is indicated by using a category identifier. Each category corresponds to one job attribute, and the job attribute corresponding to each category includes a same attribute of jobs of the category, or includes all attributes of the jobs of the category. The job attribute corresponding to each category includes at least one of a queue identifier, a user type, a user identifier, and a job tag. A category 1 is used as an example. Jobs 1 and 2 both belong to the category 1, a job attribute of the job 1 includes a queue identifier 1, a user type 1, and a user identifier 1, and a job attribute of the job 2 includes the queue identifier 1, the user type 1, and a user identifier 2. A job attribute corresponding to the category 1 includes the queue identifier 1 and the user type 1. In this case, the job attribute corresponding to the category 1 includes a same attribute of the job 1 and the job 2. If a job attribute of a new job includes the queue identifier 1 and the user type 1, a category of the new job is the category 1. Alternatively, the job attribute corresponding to the category 1 includes the queue identifier 1, the user type 1, and user identifiers 1 to 10. In this case, the job attribute corresponding to the category 1 includes all attributes of the job 1 and the job 2. If a job attribute of a new job includes the queue identifier 1, the user type 1, and a user identifier 3, a category of the new job is the category 1.

In a possible implementation, a same category corresponds to at least one job queue, and different users of a same user type may submit jobs having a same job tag to a same job queue, and respectively submit jobs having different job tags to different job queues. Therefore, jobs that are submitted by different users and that have different job tags may belong to different categories. In a possible implementation, jobs in a same job queue may be from users of different user types. Therefore, queue identifiers in job attributes corresponding to different categories may be the same.

For example, the scheduling node stores a first category relationship table, and the first category relationship table records a correspondence between a plurality of categories and job attributes, as shown in the following Table 1. It can be learned from Table 1 that a job attribute corresponding to a category 1 includes a job queue 1, a user type 1, user identifiers 1-1 to 1-5, and job tags 1-A to 1-C. It can be learned based on the job attribute corresponding to the category 1 that the user type 1 includes five users: users 1-1 to 1-5. Jobs submitted by the users of the user type 1 include three job tags: the job tags 1-A to 1-C. All the jobs of the user type 1 are submitted to the job queue 1. The jobs submitted by the users of the user type 1 belong to the category 1.

TABLE 1

| Category identifier | Job attribute | | | |
|---|---|---|---|---|
| | Queue identifier | User type | User identifier | Job tag |
| Category 1 | Job queue 1 | User type 1 | User identifiers 1-1 to 1-5 | Job tags 1-A to 1-C |
| Category 2 | Job queue 1 | User type 2 | User identifiers 2-1 to 2-5 | Job tags 2-A to 2-C |
| Category 3 | Job queue 2 | User type 3 | User identifiers 3-1 to 3-5 | Job tags 2-A to 2-C |

In a possible implementation, the scheduling node determines the category of the job from the plurality of categories based on the job attribute of the job. Jobs of a same category share at least one attribute. For example, the scheduling node determines, based on the correspondence between the plurality of categories and the job attributes, a category corresponding to the job attribute of the job in the plurality of categories as the category of the job. For the category of the job, a job attribute of the category includes at least one attribute in the job attribute of the job.

For ease of description, the job attribute of the job is denoted as a first job attribute, and the recorded job attributes corresponding to the plurality of categories are denoted as second job attributes. In a possible implementation, the scheduling node queries, in the plurality of second job attributes, for a second job attribute including an attribute in the first job attribute. If it is found that at least one second job attribute includes an attribute in the first job attribute, the scheduling node uses a second job attribute that is in the at least one second job attribute and that includes a maximum quantity of attributes in the first job attribute as a second job attribute corresponding to the first job attribute, and uses a category corresponding to the second job attribute corresponding to the first job attribute as the category of the job.

For example, the job is a job A submitted by the user 1-1 of the user type 1. Table 1 shows a correspondence between categories and job attributes. If a job attribute of the job A includes the job queue 1 and the user type 1, for the job queue 1 in the job attribute of the job A, the scheduling node finds, by querying the foregoing Table 1, that job attributes corresponding to the category 1 and the category 2 in Table 1 both include the job queue 1. Then, for the user type 1 in the job attribute of the job A, the job attribute corresponding to the category 1 in Table 1 includes the user type 1, while the job attribute corresponding to the category 2 does not include the user type 1. That is, the job attribute corresponding to the category 1 in Table 1 includes a maximum quantity of attributes in the job attribute of the job A. Therefore, the scheduling node uses the category 1 as a category of the job A.

In a possible implementation, the first category relationship table is stored in a memory of the scheduling node, and the scheduling node may read the first category relationship table from the memory, and then perform step 304.

In another possible implementation, when the job attribute of the job further includes a category identifier of the job, the scheduling node does not need to determine the category of the job based on the correspondence between the job categories and the job attributes, but determines the category of the job from the plurality of categories based on the category identifier in the job attribute.

Step 306: The scheduling node obtains a recorded correspondence between the plurality of categories and reference resource quantities.

Quantities of resources actually consumed by jobs of each category have a same characteristic. For example, jobs of a same category consume a large/small quantity of processor resources in real time, or consume a large/small quantity of storage resources in real time.

A reference resource quantity corresponding to each category is obtained based on a quantity of resources actually consumed by a historical job of each category. Each category corresponds to one reference resource quantity group, and one reference resource quantity group includes a reference resource quantity of at least one type of resource, for example, a reference resource quantity of at least one type of resource of the processor resource, the memory resource, the storage resource, and the network resource. A reference resource quantity of any type of resource of the at least one type of resource is obtained based on a quantity of resources actually consumed by a historical job of a category with respect to the any type of resource.

In a possible implementation, the scheduling node stores a second category relationship table, and the second category relationship table records the correspondence between the plurality of categories and the reference resource quantities, as shown in the following Table 2. It can be learned from Table 2 that a reference resource quantity group corresponding to the category 1 includes a reference resource quantity 1 of the processor resource, a reference resource quantity 2 of the storage resource, and a reference resource quantity 3 of the network resource.

TABLE 2

| Category identifier | Reference resource quantity group | | | |
|---|---|---|---|---|
| | Reference resource quantity of a processor resource | Reference resource quantity of a memory resource | Reference resource quantity of a storage resource | Reference resource quantity of a network resource |
| Category 1 | Reference resource quantity 1 | Reference resource quantity 2 | Reference resource quantity 3 | Reference resource quantity 4 |
| Category 2 | Reference resource quantity 5 | Reference resource quantity 6 | Reference resource quantity 7 | Reference resource quantity 8 |
| Category 3 | Reference resource quantity 9 | Reference resource quantity 10 | Reference resource quantity 11 | Reference resource quantity 12 |

In a possible implementation, the second category relationship table is stored in the memory of the scheduling node, and the scheduling node may read the second category relationship table from the memory, so that the scheduling node obtains, from the category relationship table, the recorded correspondence between the plurality of categories and the reference resource quantities.

In a possible implementation, the second category relationship table and the first category relationship table are combined into a category relationship table and stored in the memory. The scheduling node may read the combined category relationship table from the memory, and obtain, from the combined category relationship table, the recorded correspondence between the plurality of categories and the reference resource quantities.

In a possible implementation, the category identifier of each category may be a queue identifier of a job queue corresponding to each category, or may be another identifier that is used to identify the category and that is different from the queue identifier. Herein, a representation manner of the category is not limited in this embodiment of this application.

In a possible implementation, before performing step 306, the scheduling node may record the correspondence between the plurality of categories and the reference resource quantities by performing a process shown in the following steps A and B.

Step A: For each category, the scheduling node determines an average value of quantities of resources actually consumed by historical jobs of each category as a reference resource quantity of each category.

One category and one type of resource are used as an example. The scheduling node obtains an average value of quantities of resources actually consumed by historical jobs of the category with respect to this type of resource as a reference resource quantity corresponding to the category with respect to this type of resource.

Step B: The scheduling node records a correspondence between each category and the reference resource quantity of each category.

For example, the scheduling node records the category identifier of each category and the reference resource quantity of each category in the second category relationship table, and stores the second category relationship table into a database. Then, the scheduling node may further load the second category relationship table from the database to the memory, so that the scheduling node subsequently can quickly read the second category relationship table directly from the memory. Alternatively, the scheduling node may first store the second category relationship table into the memory, and then the scheduling node may further store the second category relationship table into the database, to avoid a data loss in the memory.

Step 307: The scheduling node determines, based on the recorded correspondence between the plurality of categories and the reference resource quantities, a reference resource quantity corresponding to the category of the job.

For example, the scheduling node obtains, from the second category relationship table, the reference resource quantity corresponding to the category.

Step 308: The scheduling node predicts, based on the specified resource quantity and the reference resource quantity corresponding to the category of the job, a quantity of resources consumed in real time in a process of executing the job, to obtain a predicted resource quantity of the job.

The predicted resource quantity of the job includes a predicted resource quantity of at least one type of resource, for example, includes a predicted resource quantity of at least one type of resource of the processor resource, the storage resource, and the network resource.

In a possible implementation, if the preset prediction parameter indicates to provide, in the prediction mode, the function of predicting a quantity of resources required by a job, the scheduling node predicts, based on the specified resource quantity and the reference resource quantity corresponding to the category of the job, the quantity of resources consumed in real time in the process of executing the job. In other words, if the preset prediction parameter indicates to provide, in the prediction mode, the function of predicting a quantity of resources required by a job, the scheduling node performs step 308.

Because a quantity of resources required in real time in a process of executing a historical job of the category is sample data of the category, and the reference resource quantity corresponding to the category is determined by a quantity of resources actually consumed by the historical job of the category, if a quantity of samples (that is, a quantity of historical jobs) of the category is sufficient, it is considered that a reference resource quantity obtained based on quantities of resources actually consumed by sufficient samples is closer to a quantity of resources actually consumed by a new job. Therefore, in a possible implementation, the quantity of historical jobs is further considered when the predicted resource quantity of the job is predicted.

For example, the scheduling node obtains the quantity of historical jobs of the category of the job. If the quantity of historical jobs of the category of the job is greater than or equal to a quantity threshold, the scheduling node predicts, based on the specified resource quantity and the reference resource quantity corresponding to the category of the job, the quantity of resources consumed in real time in the process of executing the job.

If the quantity of historical jobs of the category is greater than or equal to the quantity threshold, it indicates that the quantity of samples (that is, the quantity of historical jobs) of the category is sufficient in this case, and it is considered that an error between the reference resource quantity corresponding to the category and the quantity of resources actually consumed by the job is small in this case. Therefore, the scheduling node performs step 308. If the quantity of historical jobs of the category is less than the quantity threshold, it indicates that the quantity of samples (that is, the quantity of historical jobs) of the category is insufficient in this case, and it is considered that the error between the reference resource quantity corresponding to the category and the quantity of resources actually consumed by the job is large in this case. Therefore, the scheduling node does not perform step 308, but performs the following step 309.

For step 308, in a possible implementation, the scheduling node predicts, based on the specified resource quantity, the reference resource quantity corresponding to the category of the job, and the quantity of historical jobs of the category, an average quantity of resources consumed in real time in a process of executing jobs of the category. The predicted average quantity of resources consumed in real time in a process of executing jobs of the category is the predicted resource quantity of the job.

For example, for a specified resource quantity of any type of resource of the at least one type of resource, the scheduling node predicts, based on the specified resource quantity of the any type of resource, a reference resource quantity corresponding to the category with respect to the any type of resource, and the quantity of historical jobs of the category, a quantity of resources consumed in real time in a process of executing the job with respect to the any type of resource, to obtain a predicted resource quantity of the job with respect to the any type of resource. The predicted resource quantity of the job with respect to the any type of resource is a predicted average quantity of resources consumed in real time in a process of executing jobs of the category with respect to the any type of resource.

For example, the scheduling node inputs, as input parameters into the following formula (1), the quantity of historical jobs of the category, the specified resource quantity of the any type of resource, and the reference resource quantity corresponding to the category with respect to the any type of resource:

$$P=(\text{baseline}*N+REQ)/(N+1)$$

P is the predicted resource quantity of the job with respect to the any type of resource, baseline is the reference resource quantity of the job with respect to the any type of resource, REQ is the specified resource quantity of the job with respect to the any type of resource, N is the quantity of historical jobs of the category of the job, and Nis greater than the quantity threshold. The formula (1) is the function implemented by the prediction software. For example, the scheduling node inputs the input parameters into the API of the prediction software, and the prediction software performs calculation on the formula (1) based on the input parameters, and outputs the predicted resource quantity P of the job with respect to the any type of resource to the scheduling node through the API.

Certainly, in some embodiments, if a requirement on the error between the reference resource quantity and the quantity of resources actually consumed by the job is not high, the scheduling node may directly calculate the predicted resource quantity of the any type of resource by using the formula (1). In this case, N may alternatively be less than the quantity threshold.

It should be noted that step 308 is an implementation in which the scheduling node predicts, based on the reference resource quantity corresponding to the category, the quantity of resources consumed in real time in the process of executing the job. In another possible implementation, if the job does not include the specified resource quantity of the job, the computer device uses the reference resource quantity corresponding to the category as the predicted resource quantity of the job. The process in which the scheduling node predicts, based on the reference resource quantity corresponding to the category, the quantity of resources consumed in real time in the process of executing the job is a process in which the scheduling node predicts the predicted resource quantity of the job based on the category of the job.

Step 309: The scheduling node uses the specified resource quantity as the predicted resource quantity of the job.

Step 310: The scheduling node schedules, based on the predicted resource quantity, a computing node in the high-performance computing system to execute the job.

The scheduling node records quantities of idle resources of a plurality of computing nodes, and the plurality of computing nodes belong to the high-performance computing system. A quantity of idle resources of a computing node is a quantity of idle resources of the computing node at a current moment. A quantity of idle resources of a computing node includes a quantity of idle resources with respect to at least one type of resource.

In a possible implementation, the scheduling node predicts, based on the predicted resource quantity and the recorded quantities of idle resources of the computing nodes, a computing node that has optimal effect in executing the job in the high-performance computing system, and the predicted computing node executes the job. For example, a process shown in the following steps 3101 to 3105 is performed.

Step 3101: The scheduling node updates the specified resource quantity of the job to the predicted resource quantity of the job.

It should be noted that step 3101 is an optional step. For example, if the scheduling node performs step 308, step 3101 is performed. If the scheduling node does not perform step 308, it indicates that the predicted resource quantity of the job is the specified resource quantity of the job, and the scheduling node does not perform step 3101.

Step 3102: The scheduling node determines a target computing node from the plurality of computing nodes. A quantity of idle resources of the target computing node is greater than or equal to the predicted resource quantity of the job.

The target computing node is a computing node scheduled by the scheduling node for the job, or may be understood as a computing node allocated by the scheduling node to the job, that is, a computing node that is predicted by the scheduling node and that has optimal effect in executing the job in the high-performance computing system.

In a possible implementation, the scheduling node queries, in the resource quantity statistics table, whether a computing node with a quantity of idle resources greater than or equal to the predicted resource quantity of the job exists, and if the computing node exists, the scheduling node determines the found computing node as the target computing node. The resource quantity statistics table records the quantities of idle resources of the plurality of computing nodes.

For example, for any computing node of the plurality of computing nodes and any type of resource of the at least one type of resource, if a quantity of idle resources of the any computing node with respect to the any type of resource is greater than or equal to a predicted resource quantity of the any type of resource, the scheduling node determines the any computing node as the target computing node.

It should be noted that in some embodiments, the scheduling node may alternatively first perform step 3102, and then perform step 3101. Herein, an execution sequence of step 3101 and step 3102 is not limited in this embodiment of this application.

Step 3103: The scheduling node sends an updated job to the target computing node.

Step 3104: The target computing node receives the updated job.

Step 3105: The target computing node executes the updated job.

Step 311: In the process of executing the job, the scheduled computing node obtains a quantity of resources actually consumed by the job.

The scheduled computing node is the target computing node. The quantity of resources actually consumed by the job includes a quantity of resources actually consumed by the job with respect to at least one type of resource, for example, a quantity of resources actually consumed with respect to at least one type of resource of the processor resource, the storage resource, and the network resource.

In a possible implementation, step 311 is implemented by performing a process shown in the following steps 3111 to 3113.

Step 3111: For any type of resource of the at least one type of resource, in a process of executing the job, the computing node collects, at an interval of preset duration, statistics on a quantity of resources consumed by the job in real time with respect to the any type of resource, to obtain a plurality of sampled resource quantities of the any type of resource.

The preset duration may be set based on an actual application scenario. Herein, the preset duration is not limited in this embodiment of this application. Each sampled resource quantity of the any type of resource is a quantity of resources consumed by the job at a moment with respect to the any type of resource. If the any type of resource is a CPU resource in the processor resource, a sampled resource quantity of the CPU resource is a quantity of CPU cores consumed by the job at a moment. If the any type of resource is the memory resource, a sampled resource quantity of the memory resource is a memory size consumed by the job at a moment. If the any type of resource is network bandwidth, a sampled resource quantity of the network bandwidth is a network bandwidth size consumed by the job at a moment.

For example, the any type of resource is the CPU resource in the processor resource. In a process of executing the job, the computing node periodically samples a CPU usage of the job at the interval of the preset duration, to obtain a plurality of CPU usages. The computing node multiplies each CPU usage by 100, to obtain a sampled resource quantity (that is, a quantity of CPU cores) of the CPU resource for the job. The quantity of CPU cores is an integer value. Therefore, if a value obtained by multiplying a CPU usage by 100 is an integer value, the computing node uses the value as a sampled resource quantity of the CPU resource. If a value obtained by multiplying a CPU usage by 100 is not an integer value, the computing node adds 1 to an integer value of the value, to obtain a sampled resource quantity of the CPU resource.

Figure 4:
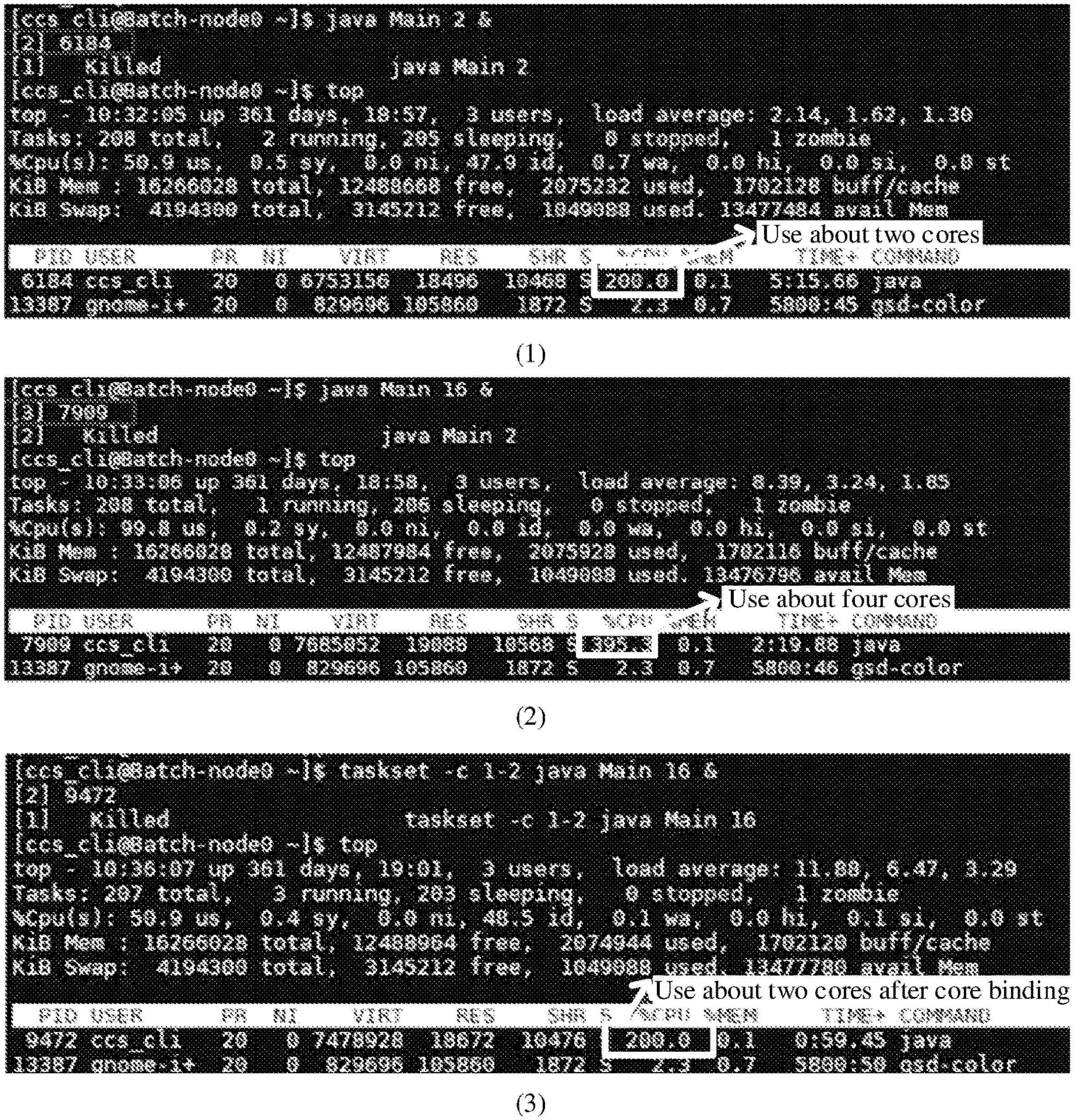
FIG. 4 is a schematic diagram of use of a processor resource according to this application.

To further describe the quantization process, refer to a schematic diagram, shown in FIG. 4, of use of a processor resource according to this application. For (1) in FIG. 4, in a process in which the computing node executes the job by using two threads, a CPU usage of the job is 200% during one sampling. Therefore, a sampled resource quantity sampled for the job in this case is about two CPU cores (that is, two cores of a CPU). For (2) in FIG. 4, in a process in which the computing node executes a job by using 16 threads, a CPU usage of the job is 395.3% during one sampling. Therefore, a sampled resource quantity sampled for the job in this case is about four CPU cores. For (3) in FIG. 4, the computing node binds two CPU cores to the job, that is, uses two specific CPU cores to provide a computing service for the job. In a process in which the computing node executes the job by using 16 threads, a CPU usage of the job keeps 200% during one sampling. Therefore, a sampled resource quantity sampled for the job in this case is about two CPU cores.

Step 3112: The computing node obtains an average sampled resource quantity and a maximum sampled resource quantity of the any type of resource based on the plurality of sampled resource quantities of the any type of resource.

The average sampled resource quantity of the any type of resource is an average value of the plurality of sampled resource quantities of the any type of resource, and the maximum sampled resource quantity of the any type of resource is a maximum value of the plurality of sampled resource quantities of the any type of resource.

Step 3113: The computing node obtains, based on the average sampled resource quantity and the maximum sampled resource quantity, a quantity of resources actually consumed by the job with respect to the any type of resource.

The quantity of resources actually consumed with respect to the any type of resource is greater than or equal to the average sampled resource quantity and less than or equal to the maximum sampled resource quantity. In other words, the quantity of resources actually consumed with respect to the any type of resource ranges between the average sampled resource quantity and the maximum sampled resource quantity.

To enable the quantity of resources actually consumed with respect to the any type of resource to range between the average sampled resource quantity and the maximum sampled resource quantity, a skilled person may set, on each computing node, a weight corresponding to the any type of resource. The weight is any value greater than or equal to 0 and less than or equal to 1. The weight indicates a preference for the average sampled resource quantity and the maximum sampled resource quantity when the quantity of resources actually consumed with respect to the any type of resource is calculated.

In a possible implementation, the computing node inputs the average sampled resource quantity and the maximum sampled resource quantity as input parameters into the following formula (2):

$$u=w^*(u_{max}-u_{avg})+u_{avg}$$

u is the quantity of resources actually consumed by the job with respect to the any type of resource, w is the weight corresponding to the any type of resource, $u_{max}$ is the maximum sampled resource quantity of the job with respect to the any type of resource, and $u_{avg}$ is the average sampled resource quantity of the job with respect to the any type of resource. After the computing node inputs the input parameters into the formula (2), the computing node performs calculation on the formula (2), and outputs the quantity u of resources actually consumed with respect to the any type of resource.

It should be noted that, when the any type of resource is the processor resource, the target computing node may further quantize the quantity u of resources actually consumed with respect to the any type of resource, and use a quantized quantity u of resources actually consumed as a final quantity of resources actually consumed with respect to the any type of resource.

Step 312: After the job is executed, the computing node sends the quantity of resources actually consumed by the job to the scheduling node.

In a possible implementation, after the job is executed, the computing node generates a job completion response of the job, and sends the job completion response to the scheduling node. The job completion response indicates that the job has been executed, and the job completion response includes the quantity of resources actually consumed by the job.

Step 313: The scheduling node receives the quantity of resources actually consumed by the job.

In a possible implementation, the scheduling node receives the job completion response of the job. When the job completion response of the job is received, it indicates that the job has been executed, and the scheduling node parses out, from the job completion response, the quantity of resources actually consumed by the job.

In a possible implementation, if the scheduling node records a correspondence between the category of the job and the job (that is, the job belongs to one category), that is, the scheduling node knows the category of the job, the scheduling node performs the following step 314. If the scheduling node does not record the correspondence between the category of the job and the job, the scheduling node determines the category of the job from the plurality of categories (that is, the process shown in step 305). After determining the category of the job, the scheduling node performs the following step 314.

Step 314: The scheduling node updates, based on the quantity of resources actually consumed by the job and the quantity of historical jobs of the category of the job, the reference resource quantity corresponding to the category.

In a possible implementation, for the any type of resource of the at least one type of resource, the scheduling node inputs, as input parameters into the following formula (3), the quantity of resources actually consumed by the job with respect to the any type of resource, the quantity of historical jobs of the category, and the reference resource quantity corresponding to the category with respect to the any type of resource:

$$\text{baseline}'=(\text{baseline}*N+\text{REQ})/(N+1)$$

baseline' is an updated reference resource quantity of the any type of resource. After inputting the input parameters into the formula (3), the scheduling node performs calculation on the formula (3), and outputs the updated reference resource quantity baseline' of the any type of resource.

Step 315: The scheduling node records a correspondence between the updated reference resource quantity and the category of the job.

For example, the scheduling node modifies, in the second category relationship table in the memory and/or the database, the reference resource quantity corresponding to the category to the updated reference resource quantity, so that the scheduling node subsequently can directly read the second category relationship table from the memory, and a data loss in the memory can be avoided.

It should be noted that the database in this application is implemented by a persistent storage medium, and the database may be located in the scheduling node, or may be located in a storage node other than the scheduling node.

It can be learned from the foregoing description that, after receiving the to-be-processed job, the scheduling node in the high-performance computing system predicts, based on the category of the job, the quantity of resources consumed in real time in the process of executing the job. Because quantities of resources consumed in real time in a process of executing jobs of a same category are close, compared with the specified resource quantity, the predicted resource quantity is closer to the quantity of resources actually consumed by the job. Therefore, when the scheduling node schedules, based on the predicted resource quantity, the computing node in the high-performance computing system to execute the job, effective utilization of resources in the computing node can be improved, and job processing efficiency can be improved. Further, when predicting, based on the category of the job, the quantity of resources consumed in real time in the process of executing the job, the scheduling node may predict, based on the reference resource quantity corresponding to the category, the quantity of resources consumed in real time in the process of executing the job. Because the reference resource quantity is obtained based on the quantity of resources actually consumed by the historical job of the category, the predicted resource quantity predicted based on the reference resource quantity corresponding to the category is closer to the quantity of resources actually consumed by the job. Therefore, when the scheduling node schedules, based on the predicted resource quantity, the computing node in the high-performance computing system to execute the job, effective utilization of a resource in the computing node can be further improved. Further, after obtaining the reference resource quantity corresponding to the category based on the quantity of resources actually consumed by the historical job of the category, the scheduling node may store, into the memory, the correspondence between the reference resource quantity corresponding to the category and the category, so that when subsequently predicting the predicted resource quantity of the job of the category, the scheduling node may read, from the memory, the reference resource quantity corresponding to the category, and does not need to calculate, in real time based on the quantity of resources actually consumed by the historical job of the category, the reference resource quantity corresponding to the category, thereby improving efficiency of reading the reference resource quantity.

Figure 5:
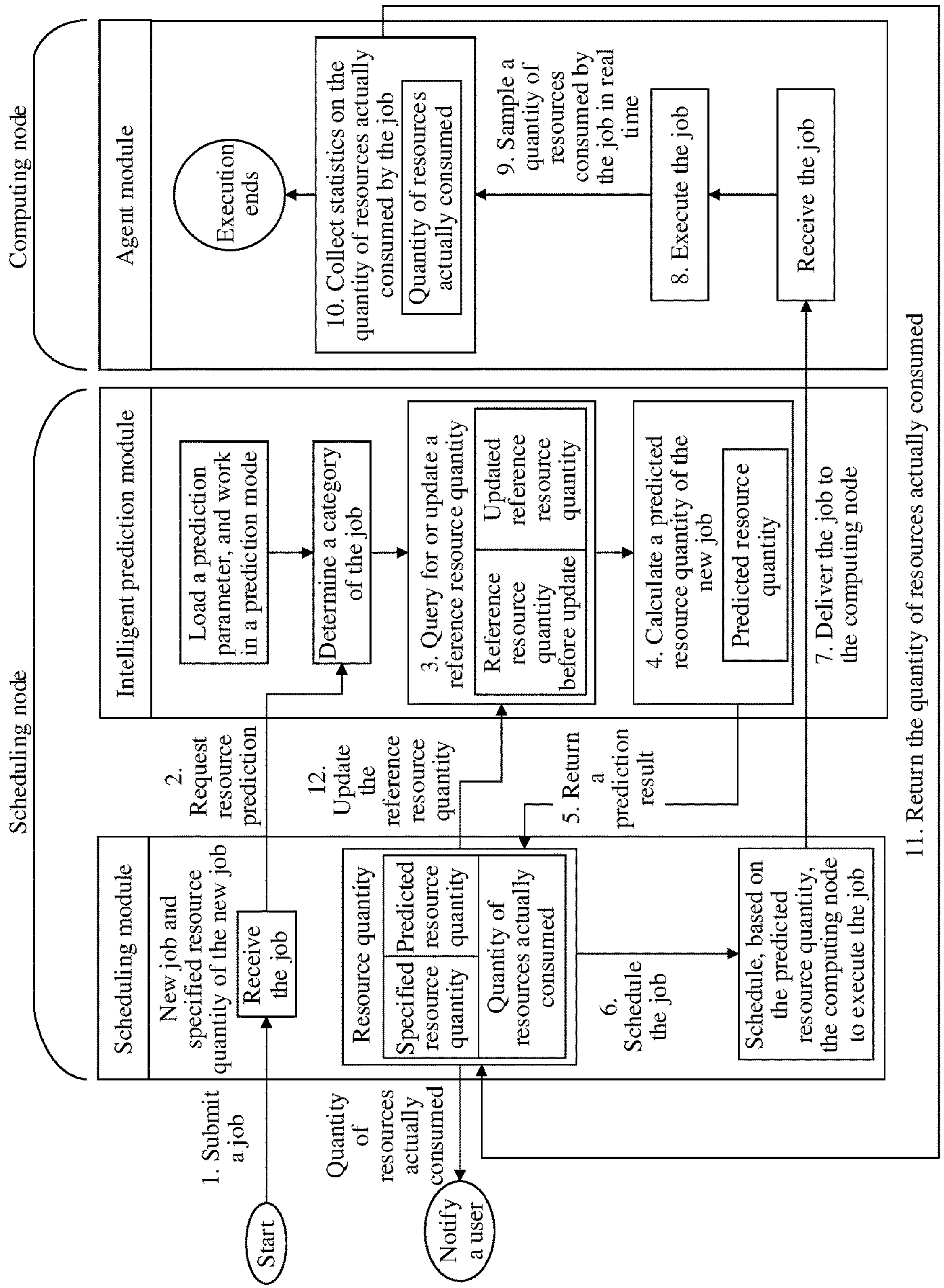
FIG. 5 is a schematic diagram of a job processing procedure according to this application.

To further describe the process shown in FIG. 3A and FIG. 3B, refer to a schematic diagram, shown in FIG. 5, of a job processing procedure according to this application. Initially, an intelligent prediction module in a scheduling node loads a prediction parameter. If the prediction parameter is a first prediction parameter, it indicates that the scheduling node works in a prediction mode. A terminal submits a job to the scheduling node. After receiving the job, a scheduling module in the scheduling node requests the intelligent prediction module to predict a predicted resource quantity of the job. The intelligent prediction module determines a category of the job, queries for a reference resource quantity corresponding to the category of the job, and calculates the predicted resource quantity (for example, predicting a quantity of CPU cores, a memory size, and a network bandwidth size required by the job) of the job based on the reference resource quantity and a specified resource quantity. The intelligent prediction module returns the predicted resource quantity of the job as a prediction result to the scheduling module. The scheduling module queries for a computing node with a quantity of idle resources (for example, a quantity of idle CPU cores and a size of idle memory space) greater than or equal to the predicted resource quantity. The scheduling module schedules at least one found computing node to execute the job, for example, delivers the job to the found computing node. After receiving the job delivered by the scheduling node, an agent module in the computing node starts to execute the job, periodically samples a quantity of resources consumed by the job in real time, and collects statistics on a quantity of resources actually consumed (for example, a quantity of CPU cores, a memory size, or a network bandwidth size actually consumed) by the job. The agent module returns the quantity of resources actually consumed by the job to the scheduling module. The intelligent prediction module updates, based on the quantity of resources actually consumed by the job, the reference resource quantity corresponding to the category of the job. A user may query, on the terminal, for the quantity of resources actually consumed by the job. The scheduling module in FIG. 5 may be a module that integrates the job management module 11 and the resource scheduling module 12 in FIG. 2. The intelligent prediction module may be a module that integrates the resource consumption prediction module 13 and the reference quantity management module 14 in FIG. 2.

Figure 6:
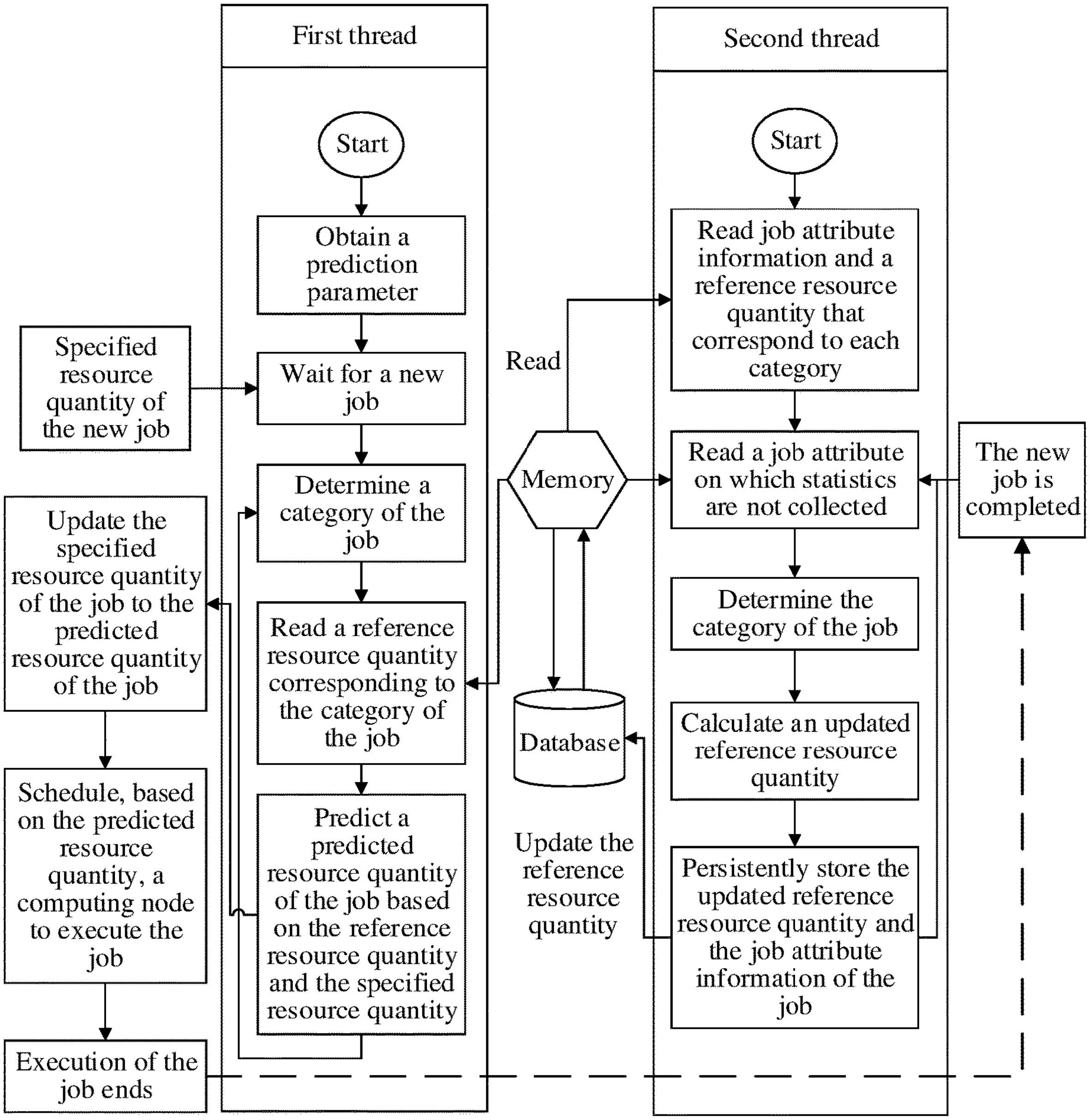
FIG. 6 is a flowchart of predicted a resource quantity and updating a reference resource quantity by different threads according to this application.

In a possible implementation, the processes of predicted resource quantity of the job and updating the reference resource quantity by the scheduling node are respectively performed by different threads of the scheduling node. For example, FIG. 6 is a flowchart of predicted a resource quantity and updating a reference resource quantity by different threads according to this application. Initially, a first thread obtains a prediction parameter. If the prediction parameter is a first prediction parameter, the first thread works in a prediction mode, and the first thread waits for a new job in the prediction mode. After receiving a job submitted by a terminal, the first thread determines a category of the job, reads, from a memory, a reference resource quantity corresponding to the category, and predicts a predicted resource quantity of the job based on the read reference resource quantity and a specified resource quantity of the job. The first thread updates the specified resource quantity of the job to the predicted resource quantity of the job, and schedules, based on the predicted resource quantity, a computing node to execute the job. When execution of the job ends, that is, after the job is completed, the computing node returns a quantity of resources actually consumed by the job to the scheduling node, and the scheduling node sends the quantity of resources actually consumed by the job to a second thread. After receiving the quantity of resources actually consumed by the job, the second thread reads, from the memory, a job attribute and a reference resource quantity that correspond to each category. The second thread further reads, from the memory, a job attribute (that is, a job attribute of the newly completed job) on which statistics are not collected. The second thread determines the category of the job based on the job attribute of the newly completed job. Then, the second thread updates the reference resource quantity corresponding to the category of the job based on the predicted resource quantity of the job, or persistently stores an updated reference resource quantity and the job attribute of the job into a hard disk, and stores the updated reference resource quantity into a database. Then, the memory loads the updated reference resource quantity from the database or the hard disk, making it convenient for the first thread to subsequently query for a latest reference resource quantity corresponding to the category.

Figure 7:
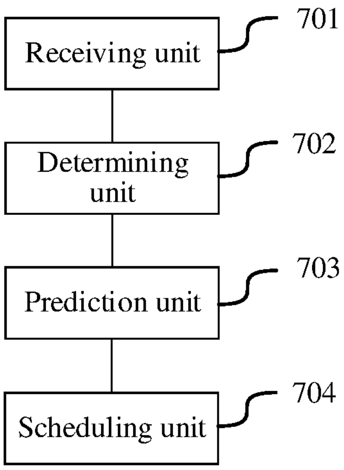
FIG. 7 is a schematic diagram of a structure of a job processing apparatus according to this application.
Figure 8:
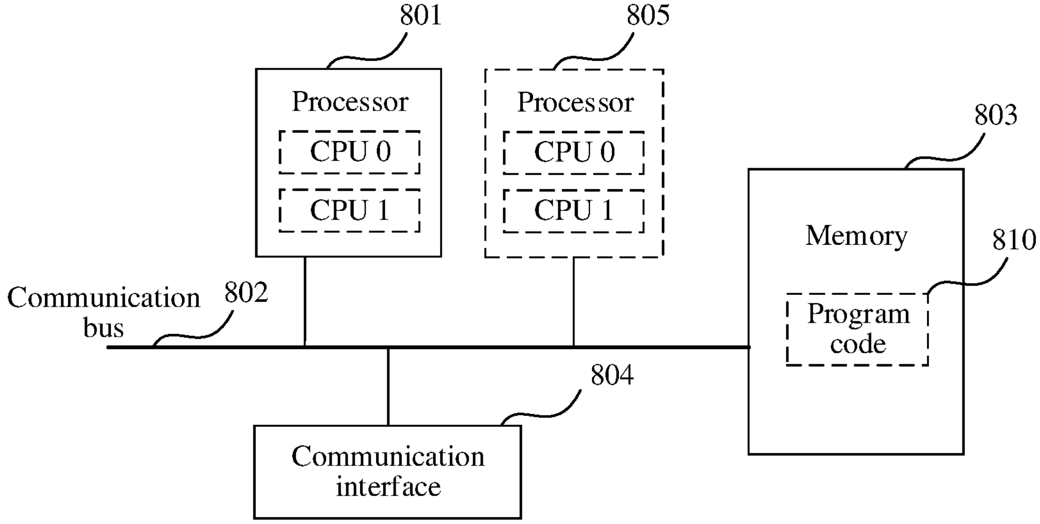
FIG. 8 is a schematic diagram of a structure of a computer device according to this application.

With reference to FIG. 1 to FIG. 6, the foregoing describes in detail the job processing method provided in this application. With reference to FIG. 7 and FIG. 8, the following describes a job processing apparatus and a computer device that are provided in this application.

FIG. 7 is a schematic diagram of a structure of a job processing apparatus according to this application. The apparatus 700 may be a part of the scheduling node in the foregoing embodiments, FIG. 1 to FIG. 3A and FIG. 3B, or FIG. 5 and FIG. 6, and is configured to perform the method performed by the scheduling node. The apparatus 700 is configured as a scheduling node in a high-performance computing system. The apparatus 700 includes:

a receiving unit 701, configured to receive a job to be processed by the high-performance computing system;

a determining unit 702, configured to determine a category of the job;

a prediction unit 703, configured to predict a predicted resource quantity of the job based on the category, where the predicted resource quantity is a predicted quantity of resources consumed in real time in a process of executing the job; and a scheduling unit 704, configured to schedule, based on the predicted resource quantity, a computing node in the high-performance computing system to execute the job.

It should be understood that the apparatus 700 in this embodiment of this application may be implemented by using a central processing unit (CPU), or may be implemented by using an application-specific integrated circuit (ASIC) or a programmable logic device (PLD). The PLD may be a complex programmable logic device (CPLD), a field-programmable gate array (FPGA), a generic array logic (GAL), or any combination thereof. Alternatively, when the job processing method shown in FIG. 2 to FIG. 6 may be implemented by using software, the apparatus 700 and the modules of the apparatus 700 may be software modules.

In a possible implementation, the prediction unit 703 is configured to predict, based on a reference resource quantity corresponding to the category, a quantity of resources consumed in real time in the process of executing the job, to obtain the predicted resource quantity. The reference resource quantity is obtained based on a quantity of resources actually consumed by a historical job of the category.

In a possible implementation, the apparatus 700 further includes an adjustment unit.

The receiving unit 701 is further configured to receive a mode adjustment instruction. The mode adjustment instruction instructs to enable a prediction mode, and provide, in the prediction mode, a function of predicting a quantity of resources required by a job.

The adjustment unit is further configured to enable the prediction mode according to the mode adjustment instruction.

The prediction unit 703 is configured to predict, in the prediction mode based on the reference resource quantity corresponding to the category, the quantity of resources consumed in real time in the process of executing the job.

In a possible implementation, the prediction unit 703 is configured to: obtain a quantity of historical jobs of the category in the prediction mode; and if the quantity of historical jobs of the category is greater than or equal to a quantity threshold, predict, based on the reference resource quantity corresponding to the category, the quantity of resources consumed in real time in the process of executing the job.

In a possible implementation, the job includes a specified resource quantity of the job, and the prediction unit 703 is configured to: predict, based on the specified resource quantity, the reference resource quantity corresponding to the category, and the quantity of historical jobs of the category, an average quantity of resources consumed in real time in a process of executing jobs of the category.

In a possible implementation, the apparatus 700 further includes:

an obtaining unit, configured to obtain an average value of quantities of resources actually consumed by the historical jobs of the category as the reference resource quantity corresponding to the category; and a first recording unit, configured to record a correspondence between the category and the reference resource quantity corresponding to the category.

In a possible implementation, the job includes a job attribute of the job, and the job attribute indicates an attribute of the job. The determining unit 702 is configured to:

determine the category of the job from a plurality of categories based on the job attribute of the job. Jobs of a same category share at least one attribute.

In a possible implementation, the job attribute includes a user type of a user to which the job belongs and a queue identifier of a job queue in which the job is located. The determining unit 702 is configured to: determine, based on a correspondence between the plurality of categories and job attributes, a category corresponding to the job attribute in the plurality of categories as the category of the job. Each of the plurality of categories corresponds to one job attribute.

In a possible implementation, the apparatus 700 further includes an update unit and a second recording unit.

The receiving unit is further configured to receive, from the computing node, a quantity of resources actually consumed by the job.

The update unit is configured to update the reference resource quantity based on the quantity of resources actually consumed and the quantity of historical jobs of the category.

The second recording unit is configured to record a correspondence between an updated reference resource quantity and the category.

The second recording unit and the first recording unit may be a same unit, or may be different units.

It should be understood that the apparatus 700 corresponds to the scheduling node in the foregoing method embodiments, and the modules in the apparatus 700 and the foregoing other operations and/or functions are respectively used to implement steps and methods implemented by the scheduling node in the method embodiments. For specific details, refer to the foregoing method embodiments. For brevity, details are not described herein again.

It should be understood that, when the apparatus 700 processes a job, division of the foregoing functional modules is merely used as an example for description. In actual application, the foregoing functions may be allocated to different functional modules for implementation based on a requirement, that is, an internal structure of the apparatus 700 is divided into different functional modules, to implement all or some of the functions described above. In addition, the apparatus 700 provided in the foregoing embodiment and the foregoing method embodiments belong to a same concept. For a specific implementation process of the apparatus 700, refer to the foregoing method embodiments. Details are not described herein again.

It should be understood that the apparatus 700 may be equivalent to an execution component in the scheduling node 101 in the system 100.

FIG. 8 is a schematic diagram of a structure of a computer device according to this application. The computer device 800 may be a scheduling node in content described in FIG. 1 to FIG. 3A and FIG. 3B, or FIG. 5 and FIG. 6. The computer device 800 includes at least one processor 801, a communication bus 802, a memory 803, and at least one communication interface 804.

The processor 801 may be various types of computing devices that run software, such as a general-purpose central processing unit (CPU), a network processor (NP), a microprocessor, a microcontroller unit (MCU), a digital signal processor (DSP), or an artificial intelligence processor. Each computing device may include one or more cores configured to execute a software instruction to perform an operation or processing. The processor may be built in an SoC (system on chip), or may be one or more integrated circuits configured to implement the solutions of this application, for example, an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The communication bus 802 is configured to transfer information between the foregoing components. The communication bus 802 may be classified into an address bus, a data bus, a control bus, and the like. For ease of representation, only one thick line is used to represent the bus in the figure, but this does not mean that there is only one bus or only one type of bus.

The memory 803 may include a read-only memory and a random access memory, and provide instructions and data to the processor 801. The memory 803 may further include a non-volatile random access memory. For example, the memory 803 may further store information about a device type.

The memory 803 may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The memory 803 may exist independently, and is connected to the processor 801 by using the communication bus 802. Alternatively, the memory 803 and the processor 801 may be integrated.

The communication interface 804 is configured to communicate with another device or a communication network by using any transceiver-type apparatus. The communication interface 804 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, or a combination thereof.

During specific implementation, in an embodiment, the processor 801 may include one or more CPUs, for example, a CPU 0 and a CPU 1 that are shown in FIG. 8.

During specific implementation, in an embodiment, the computer device may include a plurality of processors, for example, a processor 801 and a processor 805 that are shown in FIG. 8. Each of the processors may be a single-core processor (single-CPU), or may be a multi-core processor (multi-CPU). The processor herein may be one or more devices, circuits, and/or processing cores configured to process data (for example, computer program instructions).

During specific implementation, in an embodiment, the computer device may further include an output device 806 and an input device 807. The output device 806 communicates with the processor 801, and may display information in a plurality of manners. For example, the output device 806 may be a liquid crystal display (LCD), a light-emitting diode (LED) display device, a cathode ray tube (CRT) display device, or a projector. The input device 807 communicates with the processor 801, and may receive user input in a plurality of manners. For example, the input device 808 may be a mouse, a keyboard, a touchscreen device, or a sensor device.

In some embodiments, the memory 803 is configured to store program code 810 for executing the solutions of this application, and the processor 801 may execute the program code 810 stored in the memory 803. That is, the computer device 800 may implement, by using the processor 801 and the program code 810 in the memory 803, the method provided in the foregoing embodiment of FIG. 3A and FIG. 3B.

All or some of the foregoing embodiments may be implemented by using software, hardware, firmware, or any combination thereof. When software is used for implementation, the foregoing embodiments may be implemented completely or partially in a form of a computer program product. The computer program product includes one or more computer instructions. When the computer program instructions are loaded or executed on a computer, all or some of the procedures or functions described in embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive (solid state drive, SSD).

An embodiment of this application further provides a computer program product or a computer program. The computer program product or the computer program includes computer instructions. The computer instructions are stored in a computer-readable storage medium. A processor of a computer device reads the computer instructions from the computer-readable storage medium, and the processor executes the computer instructions, to enable the computer device to perform the foregoing job processing method.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute computer-executable instructions stored in the memory, to enable the chip to perform the job processing method in the foregoing method embodiments.

The apparatus, the device, the computer-readable storage medium, the computer program product, and the chip that are provided in embodiments are all configured to perform the corresponding method provided above. Therefore, for beneficial effects that can be achieved by them, refer to the beneficial effects of the corresponding method provided above. Details are not described herein again.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A method, performed by a scheduling node in a high-performance computing system, wherein the method comprises:

receiving a mode adjustment instruction, wherein the mode adjustment instruction instructs to enable a prediction mode, and provide, in the prediction mode, a function of predicting a quantity of resources required by a job;

enabling the prediction mode according to the mode adjustment instruction;

receiving a job to be processed by the high-performance computing system;

determining a category of the job;

predicting a predicted resource quantity of the job based on the category of the job, wherein the predicted resource quantity is a predicted quantity of resources to be consumed in real time while executing the job, wherein predicting the predicted resource quantity of the job based on the category of the job comprises predicting, in the prediction mode based on a reference resource quantity corresponding to the category of the job, a quantity of resources to be consumed in real time while executing the job, to obtain the predicted resource quantity, wherein the reference resource quantity is obtained based on a quantity of resources actually consumed by a historical job of a same category as the category of the job; and scheduling, based on the predicted resource quantity, a computing node in the high-performance computing system to execute the job.

2. The method according to claim 1, wherein predicting, in the prediction mode based on the reference resource quantity corresponding to the category of the job, the quantity of resources to be consumed in real time while executing the job comprises:

obtaining a quantity of historical jobs of the category of the job in the prediction mode; and in response to the quantity of historical jobs of the category of the job being greater than or equal to a quantity threshold, predicting, based on the reference resource quantity corresponding to the category of the job, the quantity of resources to be consumed in real time while executing the job.

3. The method according to claim 1, wherein the job comprises a specified resource quantity of the job, and predicting, based on the reference resource quantity corresponding to the category, the quantity of resources to be consumed in real time while executing the job comprises:

predicting, based on the specified resource quantity, the reference resource quantity corresponding to the category of the job, and the quantity of historical jobs of the category, an average quantity of resources to be consumed in real time while executing jobs of a same category as the category of the job.

4. The method according to claim 3, wherein before predicting the predicted resource quantity of the job based on the category of the job, the method further comprises:

obtaining an average value of quantities of resources actually consumed by the historical jobs of a same category as the category of the job as the reference resource quantity corresponding to the category of the job; and recording a correspondence between the category of the job and the reference resource quantity corresponding to the category of the job.

5. The method according to claim 1, wherein the job comprises a job attribute of the job, and the job attribute indicates an attribute of the job, and determining the category of the job comprises:

determining the category of the job from a plurality of categories based on the job attribute of the job, wherein jobs of a same category share at least one common attribute.

6. The method according to claim 5, wherein:

the job attribute comprises a user type of a user to which the job belongs and a queue identifier of a job queue in which the job is located; and determining the category of the job from the plurality of categories based on the job attribute of the job comprises:

determining, based on a correspondence between the plurality of categories and a plurality of job attributes, a category corresponding to the job attribute in the plurality of categories as the category of the job, wherein each of the plurality of categories corresponds to one job attribute of the plurality of job attributes.

7. The method according to claim 1, wherein after scheduling, based on the predicted resource quantity, the computing node in the high-performance computing system to execute the job, the method further comprises:

receiving, from the computing node, a quantity of resources actually consumed by the job;

updating the reference resource quantity based on the quantity of resources actually consumed to obtain an updated reference resource quantity and updating the quantity of historical jobs of the category of the job; and recording a correspondence between the updated reference resource quantity and the category of the job.

8. A device, comprising:

a non-transitory memory storage comprising instructions; and one or more processors in communication with the non-transitory memory storage, wherein the one or more processors execute the instructions for:

receiving a mode adjustment instruction, wherein the mode adjustment instruction instructs to enable a prediction mode, and provide, in the prediction mode, a function of predicting a quantity of resources required by a job;

enabling the prediction mode according to the mode adjustment instruction;

receiving a job to be processed by a high-performance computing system;

determining a category of the job;

predicting a predicted resource quantity of the job based on the category of the job, wherein the predicted resource quantity is a predicted quantity of resources to be consumed in real time while executing the job, wherein predicting the predicted resource quantity of the job based on the category of the job comprises predicting, in the prediction mode based on a reference resource quantity corresponding to the category of the job, a quantity of resources to be consumed in real time while executing the job, to obtain the predicted resource quantity, wherein the reference resource quantity is obtained based on a quantity of resources actually consumed by a historical job of a same category as the category of the job; and scheduling, based on the predicted resource quantity, a computing node in the high-performance computing system to execute the job.

9. The device according to claim 8, wherein the instructions for predicting, in the prediction mode based on the reference resource quantity corresponding to the category of the job, the quantity of resources to be consumed in real time while executing the job comprises specific instructions for:

obtaining a quantity of historical jobs of the category of the job in the prediction mode; and in response to the quantity of historical jobs of the category of the job being greater than or equal to a quantity threshold, predicting, based on the reference resource quantity corresponding to the category of the job, the quantity of resources to be consumed in real time while executing the job.

10. The device according to claim 8, wherein the job comprises a specified resource quantity of the job, and the instructions for predicting, based on the reference resource quantity corresponding to the category, the quantity of resources to be consumed in real time while executing the job comprises specific instructions for:

predicting, based on the specified resource quantity, the reference resource quantity corresponding to the category of the job, and the quantity of historical jobs of the category, an average quantity of resources to be consumed in real time while executing jobs of a same category as the category of the job.

11. The device according to claim 10, wherein the instructions comprise further instructions for:

before predicting the predicted resource quantity of the job based on the category of the job, obtaining an average value of quantities of resources actually consumed by the historical jobs of a same category as the category of the job as the reference resource quantity corresponding to the category of the job; and recording a correspondence between the category of the job and the reference resource quantity corresponding to the category of the job.

12. The device according to claim 8, wherein the job comprises a job attribute of the job, and the job attribute indicates an attribute of the job, and the instructions for determining the category of the job comprises specific instructions for:

determining the category of the job from a plurality of categories based on the job attribute of the job, wherein jobs of a same category share at least one common attribute.

13. The device according to claim 12, wherein:

the job attribute comprises a user type of a user to which the job belongs and a queue identifier of a job queue in which the job is located; and the instructions for determining the category of the job from the plurality of categories based on the job attribute of the job comprises specific instructions for:

determining, based on a correspondence between the plurality of categories and a plurality of job attributes, a category corresponding to the job attribute in the plurality of categories as the category of the job, wherein each of the plurality of categories corresponds to one job attribute of the plurality of job attributes.

14. The device according to claim 8, wherein the instructions comprise further instructions for:

after scheduling, based on the predicted resource quantity, the computing node in the high-performance computing system to execute the job, receiving, from the computing node, a quantity of resources actually consumed by the job;

updating the reference resource quantity based on the quantity of resources actually consumed to obtain an updated reference resource quantity and updating the quantity of historical jobs of the category of the job; and recording a correspondence between the updated reference resource quantity and the category of the job.

15. A non-transitory computer-readable storage medium, wherein the non-transitory computer-readable storage medium stores at least one piece of program code, and the at least one piece of program code is read by one or more processors, to enable a computer device to:

receive a mode adjustment instruction, wherein the mode adjustment instruction instructs to enable a prediction mode, and provide, in the prediction mode, a function of predicting a quantity of resources required by a job;

enable the prediction mode according to the mode adjustment instruction;

receive a job to be processed by a high-performance computing system;

determine a category of the job;

predict a predicted resource quantity of the job based on the category of the job, wherein the predicted resource quantity is a predicted quantity of resources to be consumed in real time while executing the job, wherein predicting the predicted resource quantity of the job based on the category of the job comprises predicting, in the prediction mode based on a reference resource quantity corresponding to the category of the job, a quantity of resources to be consumed in real time while executing the job, to obtain the predicted resource quantity, wherein the reference resource quantity is obtained based on a quantity of resources actually consumed by a historical job of a same category as the category of the job; and schedule, based on the predicted resource quantity, a computing node in the high-performance computing system to execute the job.

16. The non-transitory computer-readable storage medium according to claim 15, wherein predicting, in the prediction mode based on the reference resource quantity corresponding to the category of the job, the quantity of resources to be consumed in real time while executing the job comprises:

obtaining a quantity of historical jobs of the category of the job in the prediction mode; and in response to the quantity of historical jobs of the category of the job being greater than or equal to a quantity threshold, predicting, based on the reference resource quantity corresponding to the category of the job, the quantity of resources to be consumed in real time while executing the job.

17. The non-transitory computer-readable storage medium according to claim 15, wherein the job comprises a specified resource quantity of the job, and predicting, based on the reference resource quantity corresponding to the category, the quantity of resources to be consumed in real time while executing the job comprises:

predicting, based on the specified resource quantity, the reference resource quantity corresponding to the category of the job, and the quantity of historical jobs of the category, an average quantity of resources to be consumed in real time while executing jobs of a same category as the category of the job.

18. The non-transitory computer-readable storage medium according to claim 17, wherein the at least one piece of program code is read by the one or more processors, to further enable the computer device to:

before predicting the predicted resource quantity of the job based on the category of the job, obtain an average value of quantities of resources actually consumed by the historical jobs of a same category as the category of the job as the reference resource quantity corresponding to the category of the job; and record a correspondence between the category of the job and the reference resource quantity corresponding to the category of the job.

19. The non-transitory computer-readable storage medium according to claim 15, wherein the job comprises a job attribute of the job, and the job attribute indicates an attribute of the job, and determining the category of the job comprises:

determining the category of the job from a plurality of categories based on the job attribute of the job, wherein jobs of a same category share at least one common attribute.

* * * * *